(12) United States Patent
Fitzgerald

(10) Patent No.: US 10,870,492 B2
(45) Date of Patent: Dec. 22, 2020

(54) PARACHUTE SEPARATION DEVICE

(71) Applicant: Capewell Aerial Systems LLC, South Windsor, CT (US)

(72) Inventor: Adam J. Fitzgerald, Enfield, CT (US)

(73) Assignee: Capewell Aerial Systems LLC, South Windsor, CT (US)

( * ) Notice: Subject to any disclaimer, the term of this patent is extended or adjusted under 35 U.S.C. 154(b) by 602 days.

(21) Appl. No.: 15/804,204

(22) Filed: Nov. 6, 2017

(65) Prior Publication Data

US 2018/0148185 A1 May 31, 2018

Related U.S. Application Data

(60) Provisional application No. 62/427,413, filed on Nov. 29, 2016.

(51) Int. Cl.
*B64D 17/32* (2006.01)
*B64D 17/38* (2006.01)

(52) U.S. Cl.
CPC ............. *B64D 17/32* (2013.01); *B64D 17/38* (2013.01)

(58) Field of Classification Search
CPC .......................... B64D 17/32; A44B 11/2534
See application file for complete search history.

(56) References Cited

U.S. PATENT DOCUMENTS

| 2,856,665 | A | | 10/1958 | Gimalouski |
| 2,884,676 | A | | 5/1959 | Finken |
| 3,986,234 | A | * | 10/1976 | Frost .................. A44B 11/2523 24/635 |
| 9,635,909 | B2 | * | 5/2017 | Clark ................. A44B 11/2526 |
| 2014/0059816 | A1 | * | 3/2014 | Clark ................. A44B 11/2526 24/635 |
| 2015/0272282 | A1 | | 10/2015 | Clark et al. |

FOREIGN PATENT DOCUMENTS

WO WO2016201287 12/2016

OTHER PUBLICATIONS

Search Report.

* cited by examiner

*Primary Examiner* — Richard R. Green
(74) *Attorney, Agent, or Firm* — Alix, Yale & Ristas, LLP

(57) ABSTRACT

A parachute separation device is employed to releasably secure a male link body attached to a parachute riser to a female base assembly attached to a harness. The link body has a pair of shoulders which are secured to rotatably biased lock pins. A slide assembly is displaced to rotate a pair of arms which cause the lock pins to rotate to eject the link body from the base assembly. The arms have a concave recess with an offset distal end. The arms are preferably identical but axially offset. The arms are configured to allow the force exerted on the slide assembly required to release the link body to approximately 15 lbs or less.

20 Claims, 5 Drawing Sheets

PARACHUTE SEPARATION DEVICE

BACKGROUND

This disclosure relates generally to a parachute separation device employed by aircrew personnel in the event of an emergency bailout. More particularly, this disclosure relates to a parachute separation device employed to disconnect aircrew personnel from the parachute after landing.

In Frost-type parachute separation devices for which the present disclosure has particular applicability, the parachute release has a two-step opening operation to ultimately release the parachute. There are typically two parachute separation devices on the harness.

Devices employed to disconnect a parachute have been employed for well over fifty years. A male part is attached to the parachute and a female part is attached to the harness. Separation of the parachute for safety reasons preferably requires two distinct purposeful actions. The separation device is also necessarily configured to prevent inadvertent release or opening and is configured to be resistant to snagging. The separation devices must be capable of being released or opened under high applied loads which may typically occur when the user, after landing, is being dragged. It is desirable in certain contexts to reduce the opening force required of a separation device under high load drag conditions.

A highly successful and widely employed separation device known as the Frost release employs an efficient mechanism which implements an anti-snagging design and provides a highly secure two-step opening sequence. The Frost device has a female assembly attached to the user's harness and a male component attached to the parachute riser. This disclosure addresses the female part of the release device to provide a significant reduction in the actuating mode release force while retaining the desirable features, construction and operation of the Frost release mechanism. The construction and operation of the Frost release mechanism for an early embodiment is substantially described in U.S. Pat. No. 3,986,234.

SUMMARY

Briefly stated, a parachute separation device comprises a link body and a base assembly configured to receive the link body. Two rotatable lock pins are mounted to the base assembly. The lock pins are rotatably biased and configured to releasably secure the link body. An ejection spring is engageable against the received link body. A slide assembly received by the base assembly is displaceable to rotate the lock pins. A latch which is pivotally displaceable allows the slide assembly to be displaced. A lock pin arm is rotatably fixed to each lock pin and engageable by the slide assembly. Each arm forms a medial recess and a distal offset extension. Displacing the latch and pushing the slide assembly causes the slide assembly to engage the arms and rotate the lock pins to an angular position at which the injection spring forces the received link body to eject from the base assembly.

The lock pin arms preferably have a substantially identical shape. The pins each have an axis of rotation, and the arms are mounted at different axial positions relative to the base assembly so that the arms do not engage each other upon rotation.

In one preferred embodiment, application of a displacement force of approximately 15 lbs against the slide assembly ejects the link assembly from the base assembly. The base assembly further is configured to facilitate securing the base assembly to a parachute harness. The link body comprises a pair of shoulders which are engaged by the lock pins. The link body also is further configured to facilitate securing the link body to a parachute riser.

A parachute separation assembly for releasably securing a parachute to a harness comprises a link body attachable to a parachute riser and comprising a pair of shoulders. A base assembly is configured to receive the link body and is attachable to a parachute harness. A pair of rotatable lock pins are disposed in the base assembly and rotatably biased and configured to releasably engage the shoulders and secure a received link body. An ejection spring is biasable against the received link body. The slide received by the base assembly is displaceable to rotate the lock pins. A latch is pivotally displaceable to allow the slide to be pushed. A lever-like lock pin arm is rotatably fixed to each lock pin and is engageable by the slide. Each arm forms a medial concave recess and a distal offset extension. Displacing the latch and pushing the slide causes the slide to engage the arms by rotating the lock pins to an angular position at which the ejection spring forces the received link body to eject from the base assembly.

The lock pin arms, in one embodiment, have a substantially identical shape. Application of a force as small as approximately 15 lbs against the slide ejects the link body from the base assembly. The pins each have an axis of rotation. The arms are mounted at axial positions wherein the arms do not engage each other upon rotation of the pins. The base assembly is attached to a parachute harness and the link body is attached to a parachute riser.

The parachute separation device for releasably securing a parachute riser to a parachute harness comprises a male link body having a crossbar and a pair of locking shoulders. A female base assembly receives the link body and mounts a crossbar. A pair of rotatable lock pins mounted to the base assembly are each rotatably biased by torsion springs to releasably secure the received link body. An ejection spring is biasable against the received link body. A slide receivable by the base assembly is displaceable to rotate the lock pins. A pivotally displaceable latch mounted to the base assembly is displaceable to allow the slide to be manually displaced. A lock pin lever arm is rotatably fixed to each lock pin and engageable by the slide. Each arm forms a concave recess and a distal extension and has a generally elongated non-linear shape. Displacing the latch and pushing the slide causes the slide to engage each lever arm and rotate the lock pins to an angular position relative to the locking shoulders at which the ejection spring forces the link body to eject from the base assembly.

The lock pin arms preferably have a substantially identical shape. The lock pins each have an axis of rotation and the lever arms are mounted at different axial positions relative to the base assembly so that the lever arms do not engage each other upon rotation of the lever arms. Each distal extension engages spaced edge portions of the slide. A parachute riser is secured to the link body crossbar. The parachute harness is secured to the base assembly crossbar.

DETAILED DESCRIPTION

Figure 1:
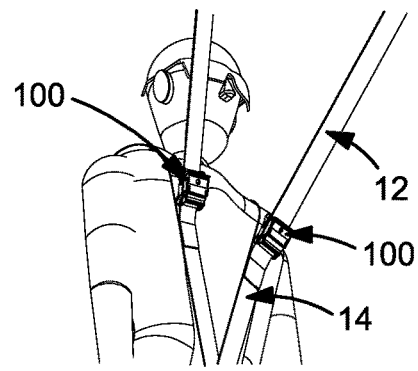
FIG. 1 is a drawing of an aircrew member fitted with a harness and a portion of a parachute riser attached to the harness by a parachute separation device.
Figure 2:
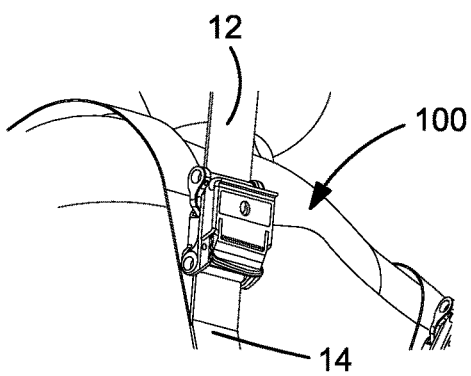
FIG. 2 is an enlarged fragmentary view of the harness, parachute separation device and parachute riser of FIG. 1.

With reference to the drawings wherein like numerals represent like parts throughout the figures, a parachute release or separation device which separates a parachute from the harness attached to an aircrew member is generally designated by the numeral 100. The parachute separation device 100 is a secure locking device of high structural and mechanical integrity which imposes a male/female engagement between a parachute riser 12 and a harness 14 attached to the aircrew member (FIG. 1) and provides a highly safe and reliable mechanism for releasing the parachute riser 12 from the harness 14 after the aircrew member has landed on the ground. Conventionally, two identical parachute releases 100 or separation devices are secured to straps of the harness 14 and attached to a parachute riser 12.

The separation device 100 comprises a female assembly 130 attached to the harness 14 and a male portion 120 attached to a parachute riser 12 and releasably received by the female assembly 130.

Figure 3:
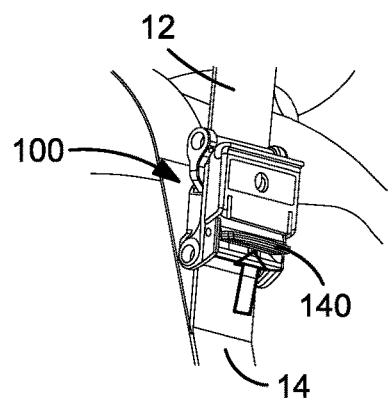
FIG. 3 is a view, partly in schematic, illustrating the first step in releasing the parachute separation device.
Figure 4:
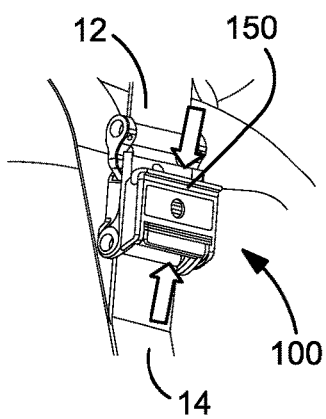
FIG. 4 is a view illustrating a second step in the release of the parachute separation device.
Figure 5:
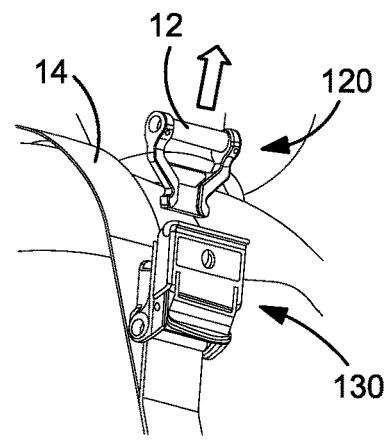
FIG. 5 is a third step showing the separation of the parachute riser and male part from the parachute separation device.

The release is accomplished in a purposeful dual step process highly resistant to inadvertent releasing of the parachute from the harness. With reference to FIG. 3, the latch 140 is initially pressed. Subsequently, the slide 150 is pressed, as illustrated in FIG. 4. The parachute riser 12 with the male assembly 120 releases from the female component 130 of the parachute separation device, as best illustrated in FIG. 5.

Figure 6:
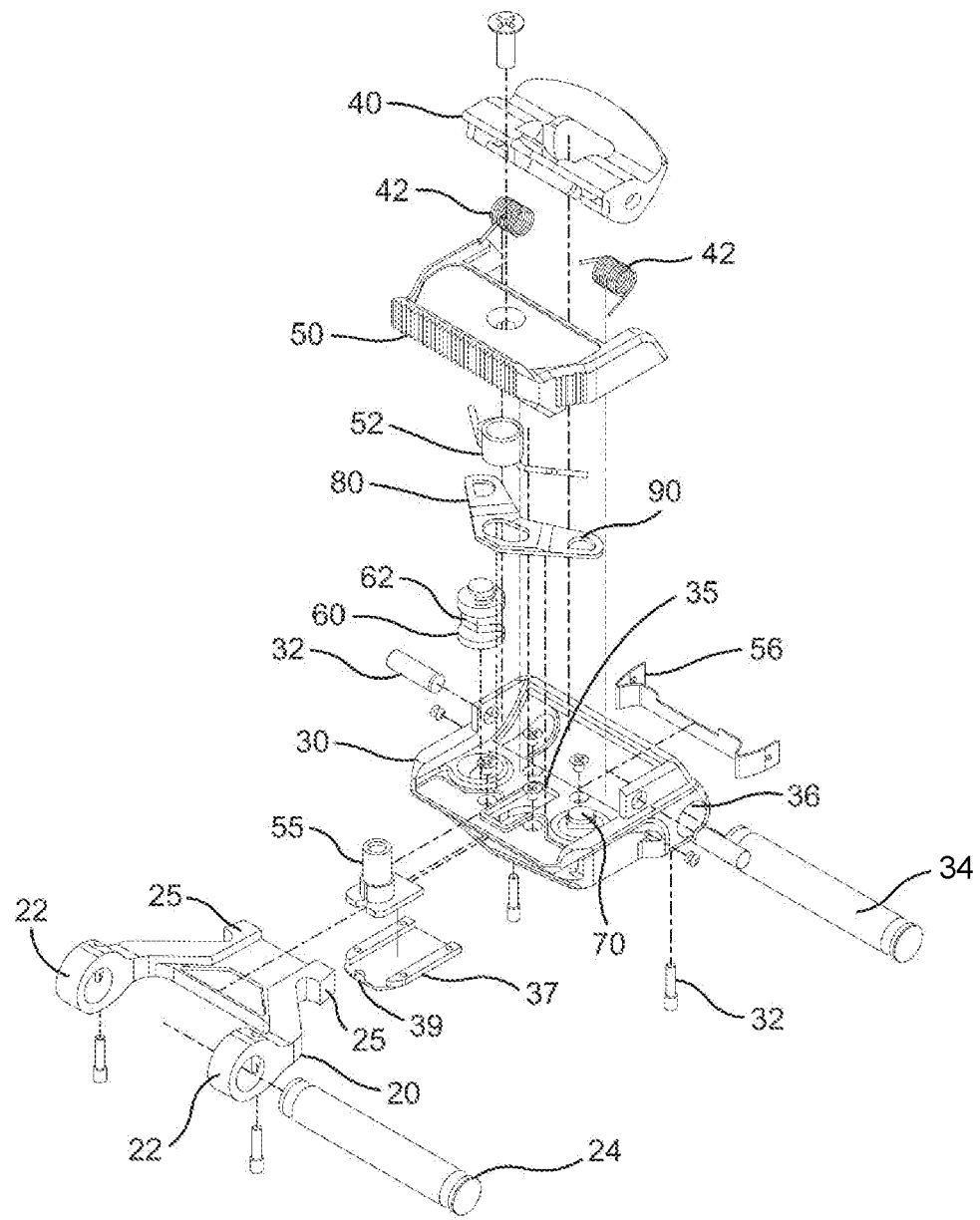
FIG. 6 is an annotated exploded view of a prior art Frost parachute separation mechanism.

A prior art Frost-type parachute release mechanism 10 is illustrated in FIG. 6. A male link body 20, which attaches to the parachute riser 12, forms a bifurcated yoke 22 for a crossbar 24, which receives the riser strap. The link body 20 tapers inwardly and terminates with transversely spaced, projecting locking shoulders 25.

A female base 30 forms a buckle slot for the link body 20. The base 30 has a pair of transversely spaced walls with aligned openings which each receives a hinge pin 32. The pins 32 rotatably mount a latch 40. The latch is biased to a non-actuated locked position by a pair of latch torsion springs 42. A guide member mounted to the base 30 receives and guides a centrally located displaceable port or bushing 55 (described below) which projects upwardly. The base 30 forms a central slot 35.

A crossbar 34 is mounted to a yoke 36 of the base for attachment of the harness strap. A slide 50 is slidably received in a recess of the base and is biased forwardly by a slide spring 52. The bushing 55 is carried by the slide 50 and is displaceable along slot 35 and guide 37. A projection 39 on the guide limits the forward displacement of the bushing 55. The rearward displacement of the slide 50 is limited by the interference of a rear edge surface with an edge surface on the latch 40 when the latch is in the non-actuated locked position. An ejector spring 56 is disposed at the rear of the slide.

The base 30 mounts a pair of generally parallel lock pins 60 and 70 which are rotatable relative to the base. Each of the lock pins has an intermediate land surface 62, 72 which, in one angular position, allows the received link body shoulders 25 to be locked in place to the base and, in a second rotatable position, allows the link body (and parachute) to be released. The lock pins 60, 70 are biased to a locked position. A pair of lock pin arms 80, 90 are mounted in fixed rotation to the respective lock pins 60, 70 and function as levers.

Figure 7:
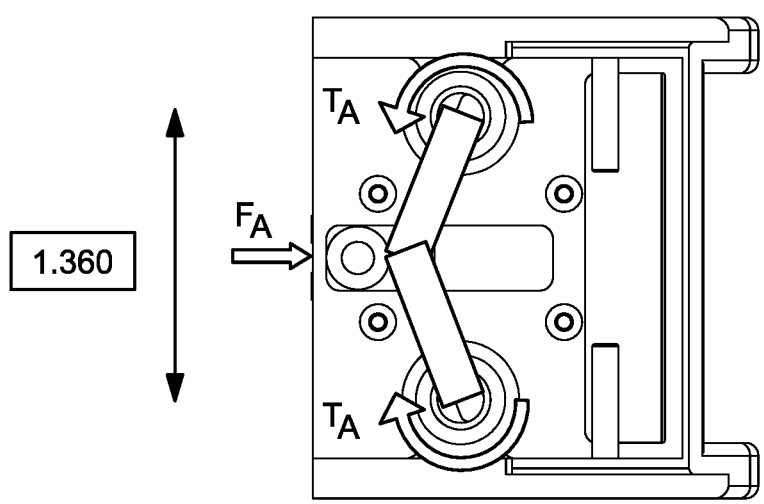
FIG. 7 is a generally top partly annotated view, portions removed, schematically illustrating the load balance for the prior art Frost parachute separation mechanism of FIG. 6.

As best illustrated in FIG. 7, which schematically shows the lock pin arms 80, 90 and the rotation of the lock pins 60, 70, for a conventional Frost-type device 10, the maximum actuating force $F_A$ is 35 pounds. The actuating torque $T_A$ at each lock pin is $½ \times F_A \times 1.360 \div 2$, which equals 11.9 lb f in, as schematically illustrated in FIG. 7. The foregoing relationships and calculations are somewhat theoretical for a representative embodiment and do not fully account for friction, etc., but approximate the actual values.

The male part is released from the female part by pressing the latch 40 which rotates the latch 40 (which disengages the interference between the latch 40 and the slide 50) and pressing or pushing the slide 50 which causes the lock pins 60, 70 to rotate and the ejector spring 56 to release the link body 20 from the female base assembly.

Figure 8:
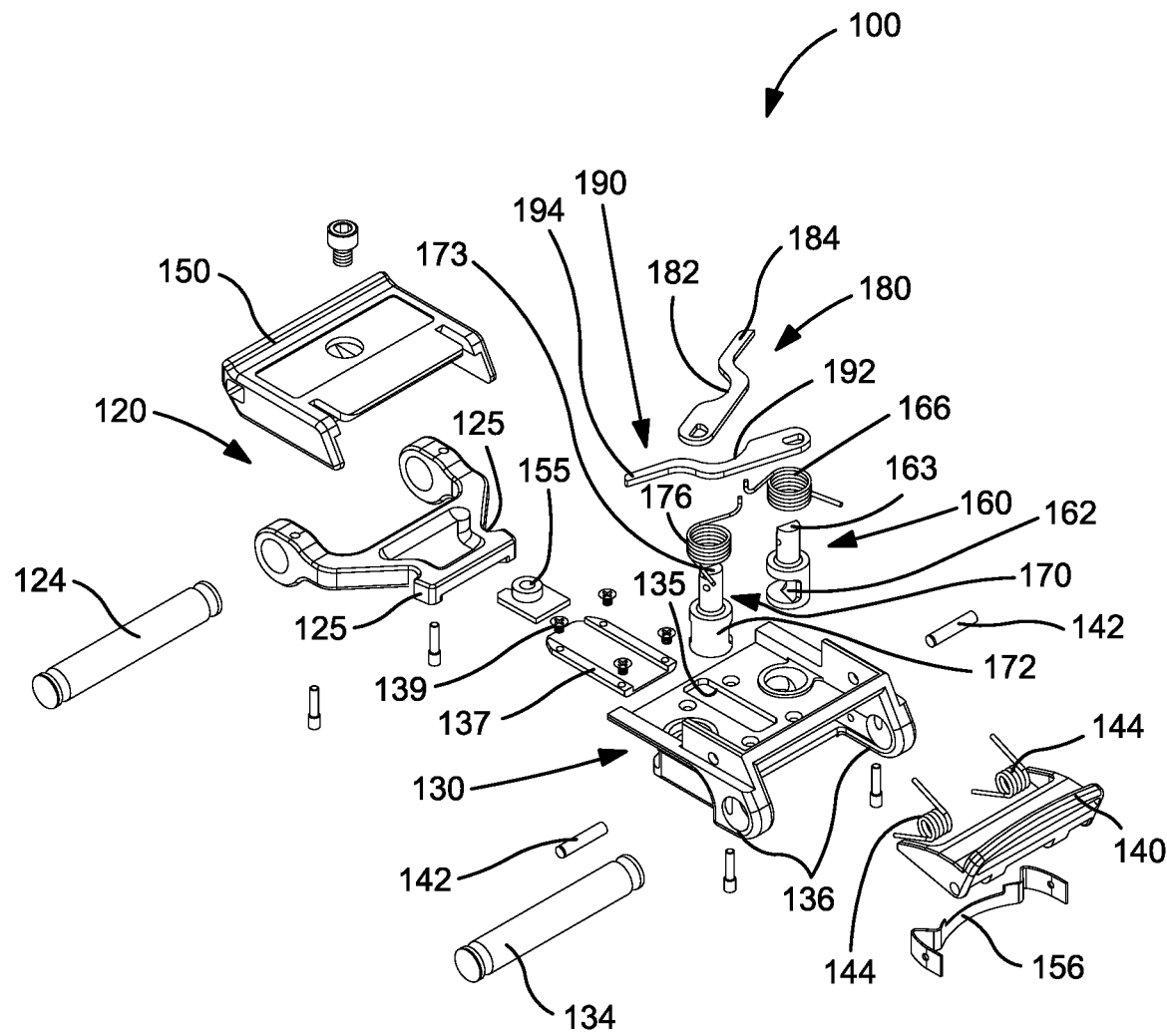
FIG. 8 is an exploded perspective view illustrating a parachute separation device incorporating an improved release mechanism for a Frost-type parachute separation mechanism.

With reference to FIG. 8, which shows the principal components of the parachute separation device 100, components of device 100, which correspond to device 10, are preceded by a lead numeral 1. A female base 130 forms a bifurcated yoke 136 which receives a crossbar 134 for mounting to a strap assembly of the harness 14. A latch 140 is rotatably mounted by latch pins 142 received in openings of transversely spaced walls of the base. The base also defines a central slot 135. A guide 137 with a forward projection 139 is mounted to the base. The latch 140 is biased to a non-actuating locked rotatable position by a pair of torsion springs 144.

A pair of generally parallel lock pins 160, 170 are rotatably mounted to the base. The lock pins 160, 170 function to engage shoulders 125 of the link body 120 to releasably secure the male link body 120 to the female base 130. The lock pins, at intermediate axial positions, present angularly positionable land surfaces 162, 172 which, dependent upon the rotation of the lock pins relative to the base 130 and to the slide 150, engage or disengage the shoulders 125. The lock pins include a coupler stem 163, 173 which extends at the top of the lock pins. The lock pins are biased to the locked position by torsion springs 166, 176.

The slide 150 carries a bushing 155 which is displaceable along the slot 135 and also along guide 137. The slide 150 retains the lock pins in a non-actuated position when the lock pins are disposed in the normal locked position securing the link body to the female assembly. The slide 150 is forwardly biased. Rearward movement of the slide 150 is limited by interfering engagement of edge surfaces with the latch 140 when the latch is in the non-actuated rotational position.

Figure 10:
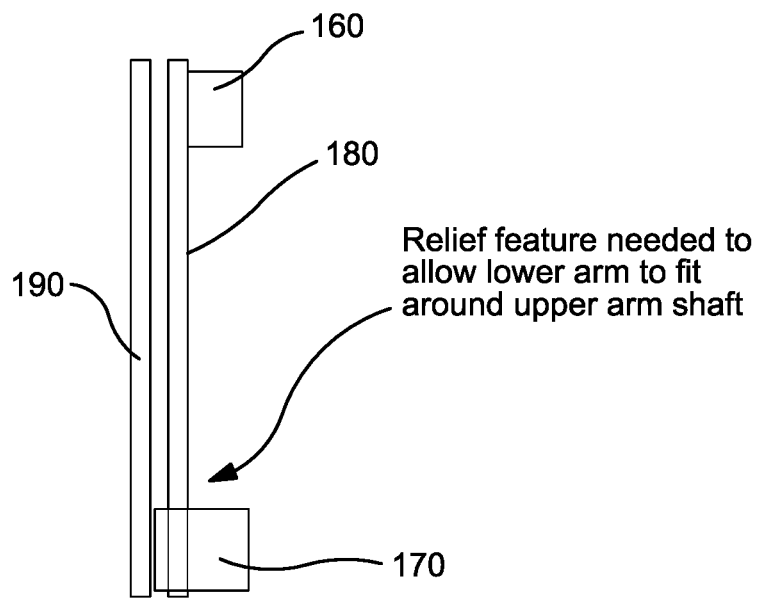
FIG. 10 is an annotated fragmentary side view illustrating a relationship between lock pin arms of the parachute separation device of FIG. 8.

A pair of substantially identical lock pin arms 180, 190 are mounted to the lock pin stems 163, 173 in a fixed rotatable position and extend outwardly from the pins and function as levers. As best illustrated in FIG. 10, the lock pin arms 180, 190 are not disposed at the precise same axial position relative to the floor of the base so that upon angular rotation, they do not interfere with each other. Each lock pin arm has a medial concave-type recess 182, 192 which provides clearance for installation of a screw which fastens the slide 150 to engage the bushing 155 to attach the slide 150 to the female base 130. The distal end of each lock pin arm 180, 190 includes an angular offset 184, 194. The lock pin arms 180, 190 engage against an inner lower surface of the slide 150 which defines the angular position of the pins 160, 170. It will be appreciated that the angular extent of the arms from end 186 to end 196 is spaced a distance greater than that for the conventional Frost release mechanism 10 best illustrated in FIG. 6.

Figure 9:
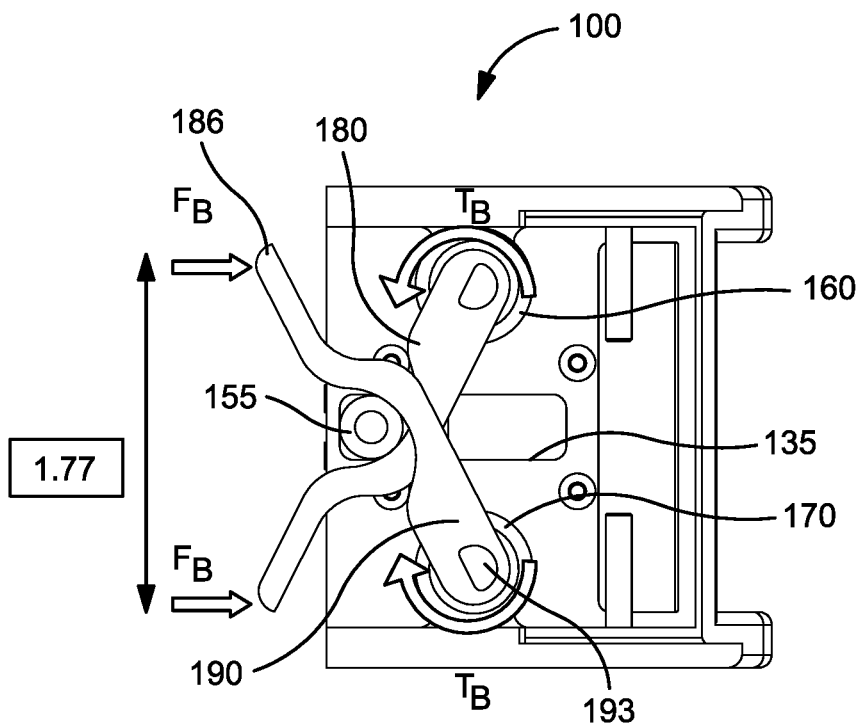
FIG. 9 is a generally diagrammatic top plan view, portions removed, schematically illustrating various forces and loads on the parachute separation device of FIG. 8.

As best illustrated in FIG. 9, which illustrates one embodiment of the parachute separation device 100. The actuating force is applied to the slide 150 in the direction of the arrows and the lock pins 160, 170 rotate in the direction of the arrows. The actuating torque $T_B$ at each lock pin 160, 170 remains at 11.9 lb f*in inch. The actuating force per lever $F_B$ is 11.9 lb f*inch÷1.77 in=6.72 lb f. The total actuating force is $2 \times F_B$=13.4 lb f. Consequently, the release is allowed to be accomplished with a significantly diminished actuating force than received for the conventional Frost type release 10 (which results from pushing the slide 150). The foregoing relationships and calculations are theoretical for a representative embodiment and do not fully account for friction, etc., but approximate the actual values.

Pushing the latch 140 rotates the latch. Interfering engagement between edges of the latch 140 and the slide is removed. This allows the slide 150 to be pushed. The two lock pin arms 180, 190 are rotated by the inner wall of the slide 150. When the lock pins are sufficiently rotated, the locking shoulders 125 of the link are no longer retained by the lock pins 160, 170, and the link body 120 is ejected by the ejector spring 156.

The required actuating load applied to the slider for the parachute separation device 100 is reduced from approximately 35 lbs for a 600 lb pre-load for the Frost device 10 to approximately 15 lbs for a 600 lb pre-load.

While preferred embodiments of the foregoing have been set forth for purposes of illustration, the foregoing description should not be deemed a limitation of the invention herein. Accordingly, various modifications, adaptations and alternatives may occur to one skilled in the art without departing from the spirit and the scope of the present invention.

The invention claimed is:

1. A parachute separation device comprising:
   a link body;
   a base assembly configured to receive the link body;
   a pair of rotatable lock pins mounted to said base assembly and rotatably biased and configured to releasably secure the link body;
   an ejection spring engageable against the received link body;
   a slide assembly received by the base assembly which is displaceable to rotate the lock pins;
   a latch which is pivotally displaceable to allow the slide assembly to be displaced; and
   a lock pin arm having a proximal portion rotatably fixed to each lock pin and engageable by said slide assembly, each arm having a distal offset extension and having a medial exterior side portion forming a recess between said proximal portion and said distal offset extension;
   wherein displacing said latch and pushing said slide assembly causes said slide assembly to engage said arms and rotate said lock pins to an angular position at which said ejection spring forces said received link body to eject from said base assembly.

2. The parachute separation device of claim 1 wherein said lock pin arms have a substantially identical shape.

3. The parachute separation device of claim 1 wherein said pins each have an axis of rotation and said arms are mounted at different axial positions relative to said base assembly wherein said arms do not engage each other upon rotation of said pins.

4. The parachute separation device of claim 1 wherein application of a displacement force of approximately 15 lbs against said slide assembly ejects said link body from said base assembly.

5. The parachute separation device of claim 1 wherein said base assembly further comprises means for securing said base assembly to a parachute harness.

6. The parachute separation device of claim 1 wherein said link body comprises a pair of shoulders which are engaged by said lock pins.

7. The parachute separation device of claim 1 wherein said lock body further comprises means for securing the link body to a parachute riser.

8. A parachute separation assembly for releasably securing a parachute to a harness comprising:
   a link body attachable to a parachute riser and comprising a pair of shoulders;
   a base assembly configured to receive said link body and attachable to a harness;
   a pair of rotatable lock pins disposed in said base assembly and rotatably biased and configured to releasably engage said shoulders and secure said link body;
   an ejection spring biasable against said link body;
   a slide received by the base assembly which is displaceable to rotate the lock pins;
   a latch which is pivotally displaceable to allow the slide to be pushed; and
   a lock pin lever arm having a proximal portion rotatably fixed to each lock pin and engageable by said slide, each arm having a distal offset extension and having a medial exterior side portion forming a concave recess between said proximal portion and said distal offset extension;
   wherein displacing said latch and pushing said slide causes said slide to engage said arms and thereby rotate said lock pins to an angular position at which said ejection spring forces said received link body to eject from said base assembly.

9. The parachute separation assembly of claim 8 wherein said lock pin arms have a substantially identical shape.

10. The parachute separation assembly of claim 8 wherein application of a force of approximately 15 lbs against said slide ejects said link body from said base assembly.

11. The parachute separation assembly of claim 8 wherein said pins each have an axis of rotation and said arms are mounted at axial positions wherein said arms do not engage each other upon rotation of said pins.

12. The parachute separation assembly of claim 8 wherein said base assembly is attached to a parachute harness.

13. The parachute separation assembly of claim 8 wherein said link body is attached to a parachute riser.

14. A parachute separation device for releasably securing a parachute riser to a parachute harness comprising:

a male link body comprising a first crossbar and a pair of locking shoulders;

a female base assembly receiving said link body and mounting a second crossbar;

a pair of rotatable lock pins mounted to said base assembly and rotatably biased by torsion springs to releasably secure the link body;

an ejection spring biasable against the link body;

a slide received by the base assembly which is displaceable to rotate the lock pins;

a pivotally displaceable latch mounted to the base assembly is displaceable to allow the slide to be manually displaced; and a lock pin lever arm having a proximal portion rotatably fixed to each lock pin and engageable by said slide, each arm having an exterior side portion forming a concave recess and a distal extension and having a generally elongated non-linear shape;

wherein displacing said latch and pushing said slide causes said slide to engage each said lever arm and rotate said lock pins to an angular position relative to said locking shoulders at which said ejection spring forces said link body to eject from said base assembly.

15. The parachute separation device of claim 14 wherein said lock pin lever arms have a substantially identical shape.

16. The parachute separation device of claim 14 wherein said lock pins each have an axis of rotation and said lever arms are mounted at different axial positions relative to said base assembly so that said lever arms do not engage each other upon rotation of said lever arms.

17. The parachute separation device of claim 14 wherein application of a force of approximately 15 lbs against said slide ejects said link body from said base assembly.

18. The parachute separation device of claim 14 wherein each distal extension engages spaced edge portions of said slide.

19. The parachute separation device of claim 14 wherein a parachute riser is secured to said link body crossbar.

20. The parachute separation device of claim 14 wherein a parachute harness is secured to said base assembly crossbar.

* * * * *